United States Patent [19]
Crannage et al.

[11] Patent Number: 5,100,294
[45] Date of Patent: Mar. 31, 1992

[54] HELICOPTER ROTORS

[75] Inventors: Mark A. Crannage, Somerton; Robert E. Hansford; Frederick J. Perry, both of Yeovil, all of England

[73] Assignee: Westland Helicopter Limited, England

[21] Appl. No.: 587,119

[22] Filed: Sep. 24, 1990

[30] Foreign Application Priority Data

Oct. 4, 1989 [GB] United Kingdom ............ 8922338

[51] Int. Cl.⁵ .................. B63H 1/06; B64C 11/12
[52] U.S. Cl. .................. 416/134 A; 416/134 R; 416/140
[58] Field of Search ........ 416/134 A, 134 R, 140, 416/141, 140 A

[56] References Cited

U.S. PATENT DOCUMENTS

| | | | |
|---|---|---|---|
| 2,231,222 | 1/1966 | Scheutzow | 416/134 A |
| 2,830,669 | 4/1958 | Klockner | 416/141 |
| 3,193,019 | 7/1965 | Drees et al. | 416/140 A |
| 3,606,575 | 9/1971 | Lermusiaux | 416/141 |
| 4,135,856 | 1/1979 | McGuire | 416/134 A |
| 4,174,137 | 11/1979 | Ferris | 416/140 A |
| 4,257,738 | 3/1981 | Schwartz et al. | 416/134 A |
| 4,297,078 | 10/1981 | Martin | 416/140 A |
| 4,345,876 | 8/1982 | Schwartz et al. | 416/134 A |
| 4,547,127 | 10/1985 | Frommlet | 416/141 |
| 4,676,720 | 6/1987 | Niwa et al. | 416/141 |

FOREIGN PATENT DOCUMENTS

| | | | |
|---|---|---|---|
| 1906764 | 4/1971 | Fed. Rep. of Germany | 416/141 |
| 2656296 | 6/1978 | Fed. Rep. of Germany | 416/134 A |

Primary Examiner—Thomas E. Denion
Attorney, Agent, or Firm—Larson & Taylor

[57] ABSTRACT

A flexible beam type helicopter rotor includes restraining means outboard of a snubber means and connected between the flexible beam and a torque tube to increase the stiffness of the rotor in the lead/lag plane as applied pitch is increased.

7 Claims, 4 Drawing Sheets

HELICOPTER ROTORS

BACKGROUND OF THE INVENTION

1. Field of the Invention

This invention relates to helicopter rotors and particularly to rotors in which each rotor blade is attached to a rotor hub by a torsionally compliant flexible beam.

Such rotors usually incorporate a torsionally stiff torque tube enveloping the beam and rigidly attached to its outer end. An inner end of the torque tube is provided with a pitch horn offset from a torsional axis of the beam for connection to a helicopter control system for changing, during operation, the pitch of an attached rotor blade. In order to reduce undesirable shear forces and bending moments a structural connection known as a snubber is provided between an inner end of the torque tube and the flexible beam.

2. Description of the Prior Art

Prior examples of such rotors are disclosed in GB-A-2001025, GB-A-2001026, GB-A-2025340, US-A-4053258 and US-A-4087203.

Constraints on rotor flap and lag dynamic behavior require that the flexible beam has different stiffness characteristics in perpendicularly opposed directions that correspond during operation to a blade flap direction generally perpendicular to a plane of rotation, and a blade lead/lag direction generally coincident with the plane of rotation. This dictates that the rigidity of the flexible beam in the lead/lag plane and thus its stiffness is substantially higher than the rigidity in the blade flap direction and, during operation, the stiffness of such rotors in the lead/lag plane reduces as applied pitch is increased.

In this specification, the in-plane direction will be referred to as the lead/lag plane and the direction perpendicular thereto will be referred to as the flap plane.

In operation, these stiffness characteristics have a major effect on the lead-lag dynamic behavior of the rotor at high angles of applied pitch and may cause an undesirably large operational range of a fundamental lag mode frequency (lowest natural lag mode frequency) between a maximum value at low pitch angles and a minimum value at high pitch angles. In the design of a helicopter rotor it is important to ensure satisfactory placement of the fundamental lag mode frequency since if, at any pitch angle, its value is too close to a major forcing frequency then the rotor may exhibit unacceptably large vibratory loads. Furthermore, adequate separation of the fundamental lag mode frequency from other natural frequencies of the rotor must be maintained at all pitch angles to prevent potentially dangerous dynamic instabilities. The major forcing frequencies of a helicopter rotor will vary and, as an example, for anti-torque rotors they can comprise frequencies of 1-per-rev and 2-per-rev, and the fundamental lag mode frequency is conventionally selected to lie between those boundaries.

Consequently it is desirable to accurately place the fundamental lag mode frequency and to minimize its range with applied pitch if acceptable rotor lag dynamic characteristics are to be obtained, and this may be difficult with existing designs due to the aforementioned undesirably large range between a maximum value of fundamental lag mode frequency at low pitch angles and a minimum value of fundamental lag mode frequency at high pitch angles.

If the fundamental lag mode frequency range cannot be controlled adequately, the rotor maximum pitch angle may have to be limited to prevent unacceptable dynamic loads or instabilities, thereby curtailing the maximum obtainable thrust and resulting in a direct performance limitation.

SUMMARY OF THE INVENTION

It is an objective of this invention to provide a helicopter rotor of the type defined in which the range of fundamental lag mode frequency throughout an applied pitch range is reduced.

Accordingly, in one aspect this invention provides a helicopter rotor having a plurality of rotor blades each supported at the end of a torsionally compliant flexible beam extending from a rotor hub, a torque tube enveloping the flexible beam, snubber means adjacent an inboard end of the torque tube and connected between the flexible beam and the torque tube, and pitch change means attached to an inner end of the torque tube for changing the pitch of the attached rotor blade, wherein the stiffness of the flexible beam is greater in a lead/lag plane than in a flap plane and the stiffness in the lead/lag plane reduces as applied pitch is increased, characterized by restraining means connecting the flexible beam and torque tube outboard of the snubber means and having stiffness characteristics such that its stiffness in the lead/lag plane increases as applied pitch is increased.

Preferably, the torque tube is more closely matched in stiffness in the lead/lag and flap planes than the flexible beam. As in the prior art arrangement, typically the ratio of stiffness of the flexible beam in the lead/lag and flap planes may be between 100:1 and 400:1 and the ratio of stiffness of the torque tube in the lead/lag and flap planes may be between 4:1 and 20:1.

The restraining means may comprise an inner spherical bearing centred on a torsional axis of the flexible beam and outer planar bearings oriented when no pitch is applied substantially in the lead/lag plane and connected between the spherical bearing and internal surfaces of the torque tube. Preferably, the spherical and planar bearings are elastomeric bearings.

In an alternative embodiment the snubber means and restraining means may comprise an integral elongated member extended lengthwise throughout at least part of the length of the flexible beam.

In another aspect the invention provides a helicopter rotor having a plurality of rotor blades each supported at the end of a flexible beam extending from a rotor hub, said flexible beam having a greater stiffness in a rotor lead/lag plane than in a rotor flap plane establishing a beam stiffness ratio, a torsionally stiff torque tube enveloping the beam and having a stiffness ratio between rotor lead/lag and flap planes lower than said beam stiffness ratio, pitch change means attached to an inner end of the torque tube for changing the pitch of the attached rotor blade whereby as the pitch is increased the flexible beam is deflected causing a reduction in its stiffness in the lead/lag plane and snubber means connected between an inboard end of the torque tube and the flexible beam, characterized by restraining means connecting the flexible beam and torque tube outboard of the snubber means and arranged so that its stiffness in the rotor lead/lag plane increases as applied pitch increases so as to induce bending of the torque tube in the lead/lag plane whereby due to its lower stiffness ratio the stiffness of the rotor in the lead/lag plane is increased to reduce a range of fundamental lag mode frequency of the rotor between respective minimum and maximum values within an operational range of applied pitch angles.

BRIEF DESCRIPTION OF THE DRAWINGS

The invention will now be described by way of example only and with reference to the accompanying drawings in which.

DETAILED DESCRIPTION OF THE DRAWINGS

Figure 1:
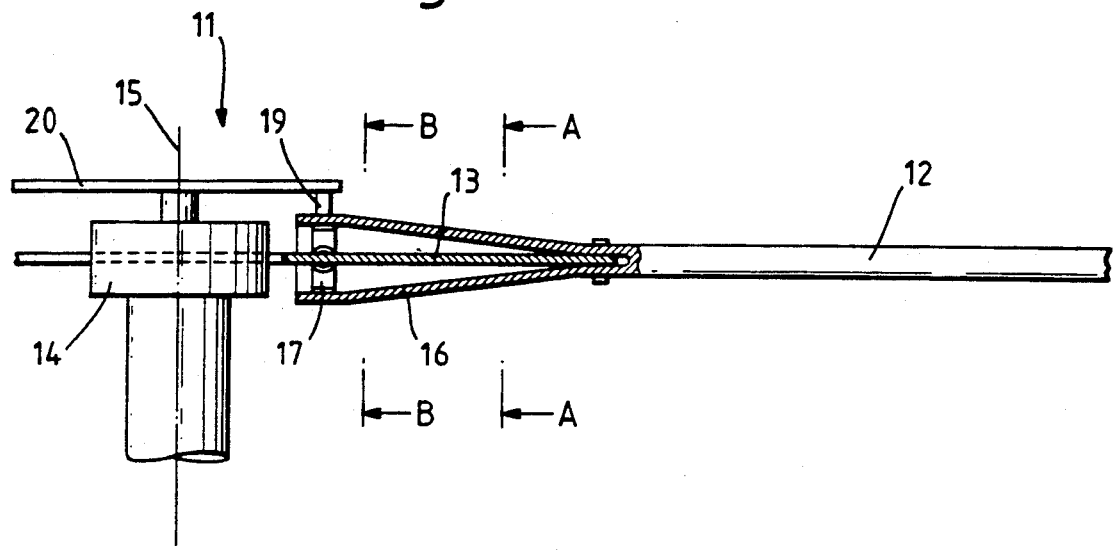
FIG. 1 is a fragmentary part sectioned side view of a helicopter anti-torque rotor according to the prior art.

Referring now to FIG. 1, a prior art helicopter anti-torque rotor 11 comprises a pair of diametrically opposed rotor blades 12 (one only being shown) interconnected by a torsionally compliant flexible beam 13 clamped in a rotor head 14 for rotation about an axis 15. Outer ends of the flexible beam 13 are fixedly attached to the rotor blades 12, and a torsionally stiff torque tube 16 formed integral with the blade extends inwardly enveloping the flexible beam 13.

A snubber means 17 interconnects an inner end of torque tube 16 and both surfaces of the flexible beam 13. A pitch horn 18 (FIG. 3) extends from an inner end of the torque tube 16 for attachment to a pitch change arm 19 carried by a spider 20 capable of axial movement to change collectively the pitch of both rotor blades 12.

In the illustrated arrangement, the flexible beam 13 is rectangular in cross section (FIGS. 2 and 3) and is centred about a pitch axis 21. The flexible beam 13 is oriented, when no pitch is applied, with its major dimension aligned with an axis y so that it is edgewise to the lead/lag plane of the blade 12. The corresponding minor dimension is aligned with a perpendicularly oriented axis x so that it is flatwise to the direction of the flap plane of the blade 12. Consequently, flexible beam 13 exhibits greater stiffness in the lead/lag plane than in the flap plane.

As will be explained more fully hereinafter, this difference in the stiffness characteristics of the flexible beam 13 has a major effect on the lead/lag dynamic behavior of the prior art rotor 11 at high values of applied rotor blade pitch.

Figure 3:
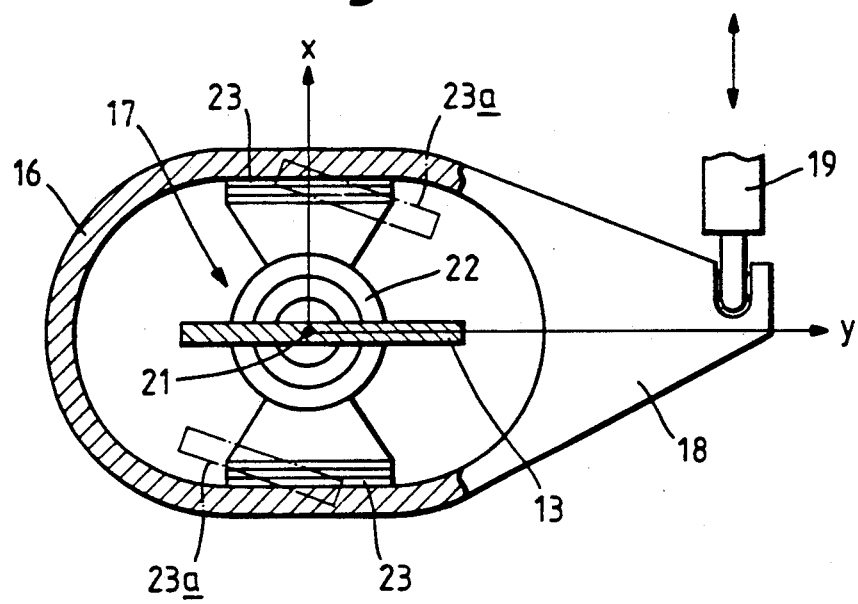
FIG. 3 is a sectioned view taken on lines B—B of FIG. 1.

As shown in FIG. 3, the snubber means 17 of the prior art rotor 11 includes an inner spherical elastomeric bearing 22 attached to opposed surfaces of flexible beam 13 and centred on the pitch axis 21. Outer planar elastomeric elements 23 connect the spherical bearing 22 to opposed internal surfaces of the torque tube 16, the elements 23 being oriented, when no pitch is applied, in the direction of axis y, i.e. the lead/lag plane.

The spherical bearing 22 permits rotational movement of the torque tube 16 about pitch axis 21 as a result of a pitch change input via rod 19 and pitch horn 18 to change the pitch of rotor blade 12, and planar elements 23 permit relative limited movements in the lead/lag plane between the torque tube 16 and the flexible beam 13. In operation, the snubber means 17 largely eliminates undesirable shear forces and bending moments in the torque tube 16 arising from forces in the control rod 19 and pitch horn 18.

It will be noted that snubber means 17 is stiffer in the direction of axis x corresponding to the flatwise direction of beam 13 (the flap plane) than in the direction of axis y corresponding to the edgewise direction of flexible beam 13 (the lead/lag plane). The low controllable shear stiffness of the planar elements 23 in the direction of axis y can be used to control the lead/lag load sharing characteristics of the flexible beam and torque tube and this can, in turn, be used to tune the natural frequencies of the rotor in the lead/lag plane.

In operation of such a prior art rotor 11, pitch changes via pitch horn 18, rod 19 and spider 20 causes rotation of the inner end of torque tube 16 about spherical bearing 22 centred on pitch axis 21 and subsequent twisting of the outer region of the torsionally flexible beam 13 about pitch axis 21. Since the inner end of the flexible beam 16 is anchored to the rotor head 14 the rotation of the torque tube 16 causes tilting of the planar elements 23 (as shown at 23a in FIG. 3) and little twist occurs in the inner region of the flexible beam 13. However twisting of the flexible beam 13 about pitch axis 21 increases with distance from the rotation axis 15 as shown in broken outline in FIG. 2, so that its edgewise and flatwise axes become inclined (as shown at 13a) with respect to the x and y axes corresponding respectively to the flap and lead/lag planes.

The rigidity of a flexible beam 13 of highly unmatched stiffness; is approximately equal to the unrotated (usually edgewise) value multiplied by the square of the cosine of the local pitch rotation thus, as the pitch angle increases, the effective local lagwise flexural rigidity reduces. Due to the clamping of the inboard end of flexible beam 13, the major elastic torsion and lag deformation in the fundamental lag mode typically occurs in the outboard region of the flexible beam 13 and, consequently, the aforementioned local rigidity reduction is reflected in a global reduction in stiffness in the flexible beam 13 in the lead/lag plane, leading to reduced fundamental lag mode frequencies at increasing pitch angles.

Figure 4:
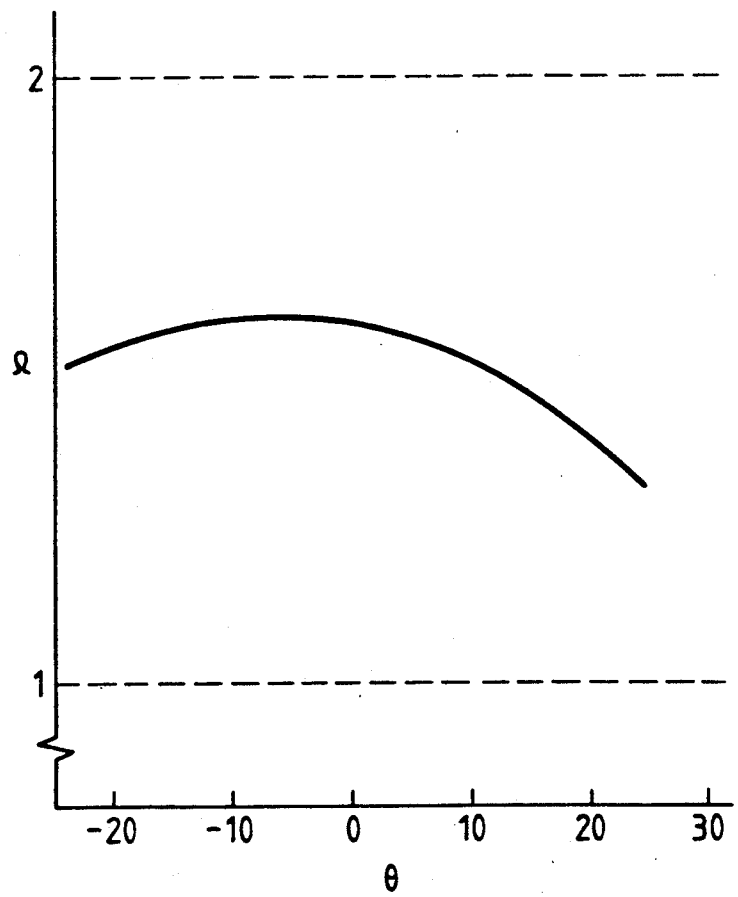
FIG. 4 is a graph showing operational characteristics of the prior art rotor.

FIG. 4 illustrates a typical relationship between the non-dimensional fundamental lag mode frequency ($\Omega$) and applied pitch ($\theta$) for a rotor of the type described and in which the fundamental lag mode frequency is positioned between 1-per-rev and 2-per-rev forcing frequencies. As will be seen there is a significant range of values variation between a maximum fundamental lag mode frequency operative at moderate negative values of applied pitch (about minus 5 degrees) and a minimum fundamental lag mode frequency operative at a maximum positive pitch angle of about 25 degrees. The fact that a maximum value occurs at a small negative angle of applied pitch is due to the particular rotor incorporating a small built in positive pitch angle.

In view of the aforementioned constraints relating to the fundamental lag mode frequency, such a significant range between maximum and minimum values may preclude freedom of placement of the fundamental lag mode frequency throughout the pitch range to avoid the aforementioned problems, or a reduction in the desired maximum permitted pitch angle with a consequent reduction in performance.

Reverting for a moment to FIG. 3 in order to consider characteristics of the snubber means 17, it is to be noted that it is characterized by low rotational stiffness due to spherical bearing 22, low (but controllable) stiffness in the direction of axis y (the lead/lag plane) due to the shear stiffness of the planar elements 23, and high stiffness in the direction of axis x (the flap plane) due to the compressive stiffness of the planar elements 23. As noted, the planar elements 23 rotate with the torque tube 16 as pitch changes are applied as indicated in broken line at 23a in FIG. 3 and, consequently, stiffness changes occur also in the snubber means 17 due to changes in applied pitch. In the particular configuration described, due to the stiffness of the snubber means 17 being substantially greater in the flap plane than in the lead/lag plane, the stiffness in the lead/lag plane will increase with increasing pitch angles. This is the reverse of the changes that occur in the flexible beam 13 as hereinbefore explained but has little effect on the overall stiffness of the rotor in the lead/lag plane due to the in-board location of the snubber means 17 where twist in the flexible beam 13 is minimal.

Figure 2:
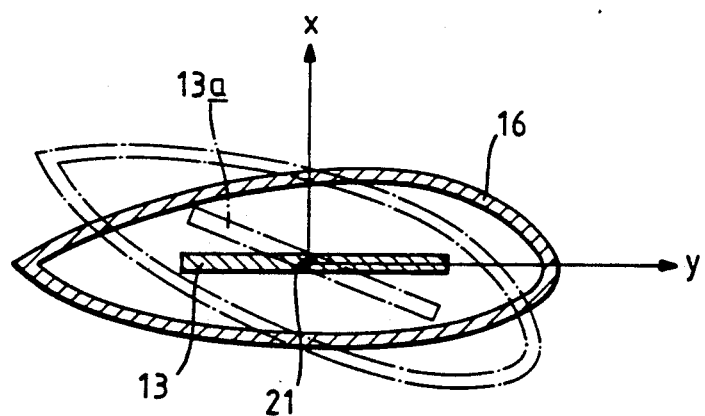
FIG. 2 is a sectioned view taken on lines A—A of FIG. 1.

Another feature of the prior art rotor evidenced by reference to FIGS. 2 and 3 is that the stiffness characteristics of the torque tube 16 in the flap and lead/lag planes are much closer to being matched than the stiffness characteristics of the flexible beam 13 and snubber means 17. Typically the ratio of stiffness in the y and x axes may be between about 4:1 and 20:1 for the torque tube 16 and may be between about 100:1 and 400:1 for the flexible beam 13. The ratio of stiffness in the x and y axes for the snubber means 17 may be between about 10:1 and 100:1.

In analysing the problem as outlined above and the properties which characterise the prior art rotor the inventors considered that restraining means outboard of the snubber means 17 and characterized by the feature that the stiffness in the lead/lag plane increased rapidly as pitch is increased may assist in reducing the variation in fundamental lag mode frequencies through the operating pitch range.

Figure 5:
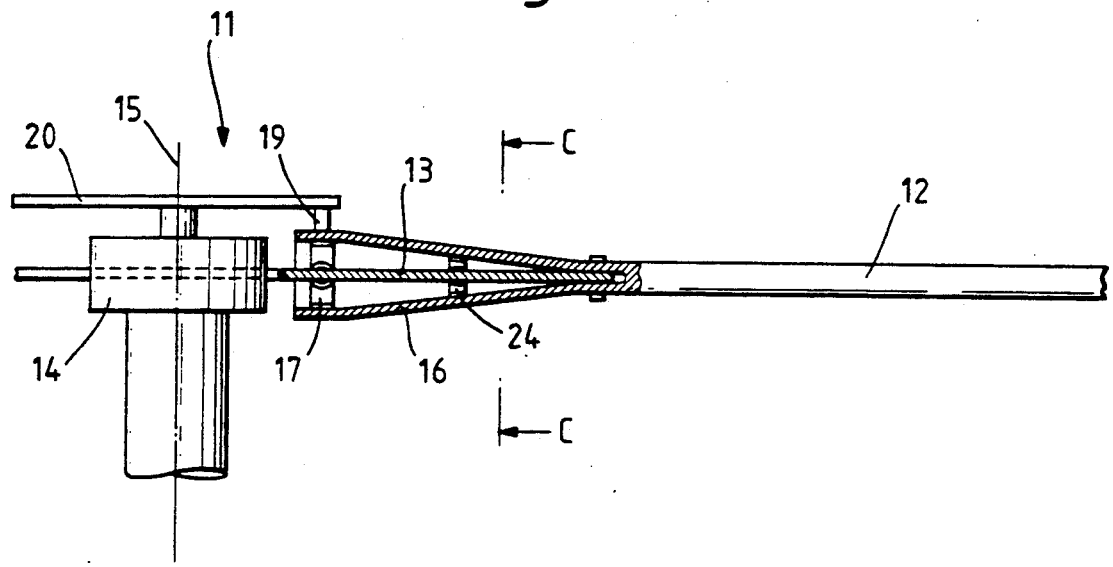
FIG. 5 is a fragmentary part sectioned side view of a helicopter rotor constructed according to this invention.

FIG. 5 is a fragmentary sectioned view of one embodiment of the invention. The rotor conforms generally to the arrangement of FIG. 1 and similar features are identified by the same reference numerals so that repetitive description is not required.

In accordance with the invention, the rotor of FIG. 5 incorporates restraining means 24 outboard of snubber means 17 intermediate the length of the torque tube 16 and connected between the flexible beam 13 and inner surfaces of the torque tube 16. Because the existing snubber means 17 incorporates the essential characteristic of rapidly increasing stiffness in the lead/lag plane with increasing applied pitch angles, in its simplest form the restraining means 24 comprises an additional snubber constructed substantially identically to snubber means 17.

Figure 6:
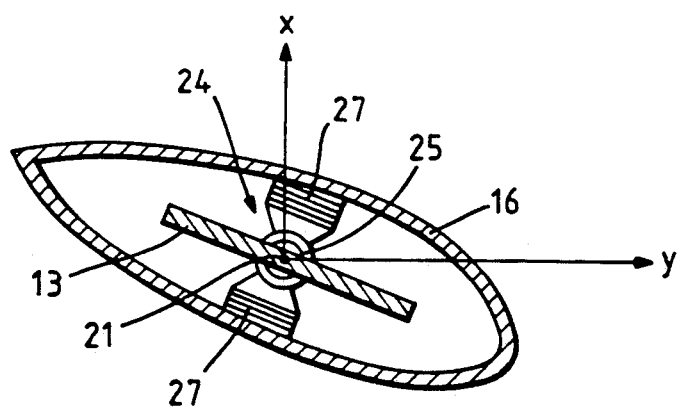
FIG. 6 is a sectioned view taken on lines C—C of FIG. 5.

Thus, restraining means 24, shown in FIG. 6 with a high applied pitch angle on torque tube 16, comprises an inner spherical elastomeric bearing 25 attached to opposed surfaces of flexible beam 13 and centred on the pitch change axis 21. Outer planar elastomeric elements 27 connect the spherical bearing 25 to opposed internal surfaces of the torque tube 16, the elements 27 being oriented, when no pitch is applied, in the direction of axis y, i.e. the lead/lag plane, similarly to the elements 23 of the snubber means 17.

Comparing the rotor of this invention as shown in FIG. 6 with that of the prior art shown in FIG. 2, it will be apparent that the local reduction in stiffness of the flexible beam 13 in the direction of axis y is accompanied at the outboard location of restraining means 24 in the rotor according to this invention by an increase in stiffness in the direction of axis y in the planar elastomeric elements 27 as they move out of a shear mode and into a compressive mode due to the increase in pitch causing twisting of the torque tube 16 about pitch change axis 21 and tilting of the planar elements 27 away from the y axis.

Figure 7:
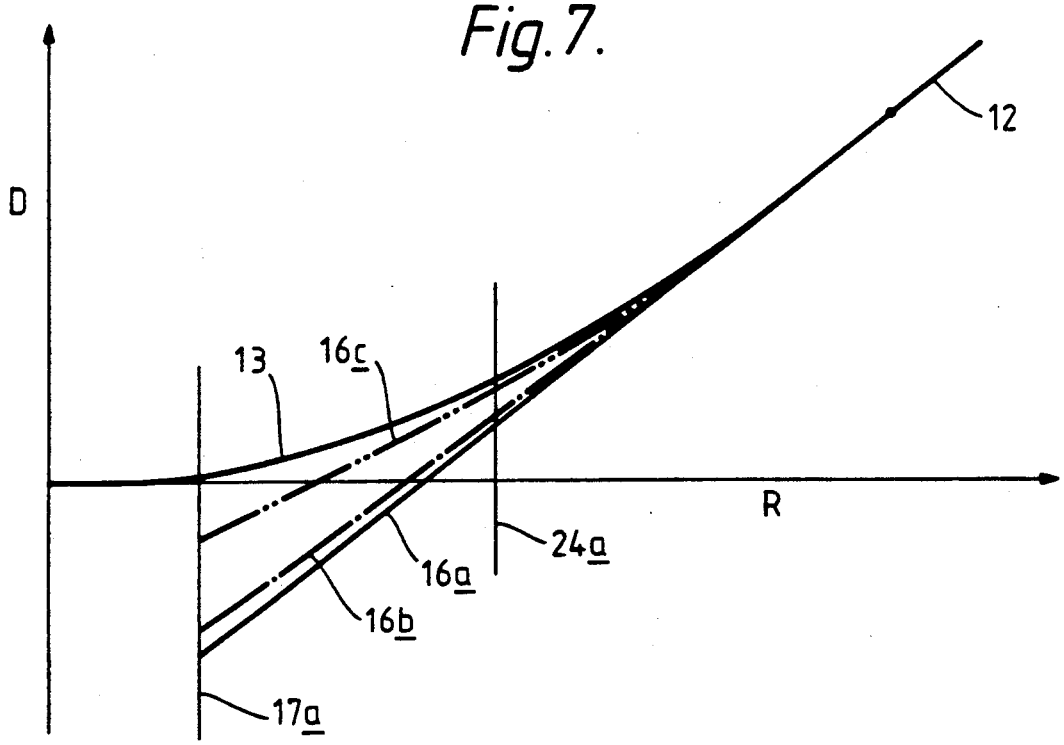
FIG. 7 is a graph comparing operational characteristics of a rotor according to the invention with prior art rotors.

The effect of the increase in stiffness due to restraining means 24 is further explained with reference to FIG. 7 which is a diagram of deflection D against rotor radius R showing a typical fundamental lag mode shape for the flexible beam 13, blade 12 and torque tube 16 at high pitch angles both with a single snubber 17 located at radial position 17a according to the prior art and with additional restraining means 24 located at radial position 24a according to this invention. For reference, a line 16a is included showing the deflection of the torque tube 16 without snubber 17 or restraining means 24.

As indicated by the maximum relative displacement between line 16a and the flexible beam 13, very little bending occurs in the torque tube 16 in a rotor without snubber means 17 or restraining means 24. Line 16b indicates a moderate increase in the amount of bending in torque tube 16 due to the fitment of snubber means 17 at radial position 17a and its increased stiffness in the lead/lag plane which induces some bending in the torque tube 16. However as already noted the overall effect on the stiffness of the rotor in the lag plane is not significant due to the snubber means 17 being located at an inboard radial position 17a.

Consider now the effect of introducing the further restraining means 24 at location 24a as indicated by line 16a of FIG. 6. Clearly, the relative displacement between the flexible beam 13 and the torque tube 16 is significantly reduced showing that considerable additional bending is induced in the torque tube 16 with an associated reduction in the proportion of bending carried by the flexible beam 13 in the lead/lag plane. Since the torque tube 16 is more closely matched in stiffness in the x and y axis, the torque tube 16 does not exhibit the high stiffness reduction in the lead/lag plane due to high applied pitch angles that is experienced in the flexible beam 13. In other words, this invention forces operational bending characteristics into an element of the rotor (the torque tube 16) that is less sensitive in respect of its stiffness in the lead/lag plane to changes in applied pitch than the flexible beam 13.

The net result is an increase in stiffness of the rotor in the lead/lag plane compared to existing rotors as pitch is increased and, consequently, a reduction in the range of fundamental lag mode frequencies within the range of applied pitch angles.

Figure 8:
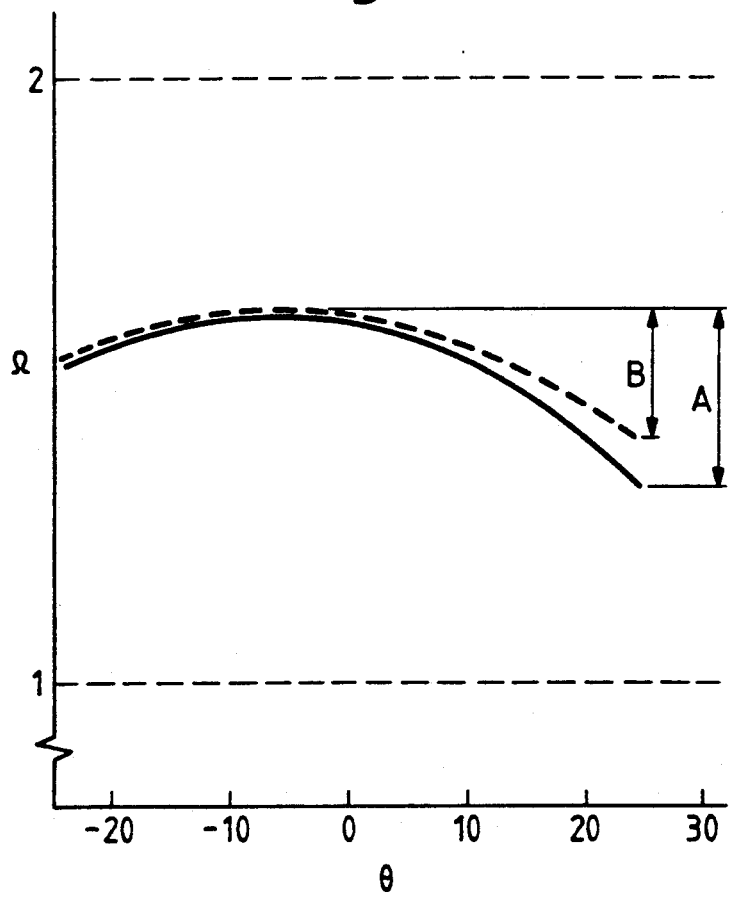
FIG. 8 is a graph illustrating the operational benefits derived from a rotor according to this invention compared to prior art rotors.

This is illustrated in FIG. 8 which plots the nondimensional fundamental lag mode frequency ($\Omega$) against applied pitch ($\theta$) and shows the typical fundamental lag mode frequency range for a prior art rotor in full line and the anticipated range of fundamental lag mode frequency of a rotor constructed according to the illustrated embodiment of this invention in broken line. For low applied pitch angles the relatively low stiffness of the additional restraining means 24 in the lead/lag plane means that little additional bending is induced in the torque tube 16 and little change in the fundamental lag mode frequency is observed.

However, at maximum applied positive pitch angles, the rapidly increasing stiffness of restraining means 24 in the lead/lag plane prevents the significant loss of stiffness experienced with prior art rotors in the rotor lead/lag plane so as to reduce the range of fundamental lag mode frequency within the range of applied pitch angles.

As shown in FIG. 8, this means that the range of fundamental lag mode frequencies between maximum and minimum values is reduced from that indicated at A for prior art rotors to that indicated at B for rotors according to the invention.

In practice, this reduction in the fundamental lag mode frequency range (range A minus range B) means that restrictions on the placement of the fundamental lag mode frequency are eased by this invention since, for example, either the maximum value can be reduced or the minimum value can be increased without getting too close or closer to either of the critical 1-per-rev or 2-per-rev boundaries.

The invention will also allow higher blade pitch angles to be obtained within dynamic load and stability constraints, allowing the rotor to produce a greater level of thrust for improved helicopter performance and this is particularly useful as a modification to an existing rotor design by allowing an increase in the maximum permitted pitch angle to improve performance without exceeding the design range of fundamental lag mode frequency.

Whilst one embodiment has been described and illustrated it will be understood that many modifications may be made without departing from the scope of the invention. For example, more than one additional restraining means 24 can be used all of which may be in the form of the snubber means 17. Any suitable restraining means in which the stiffness in the lead/lag plane increases rapidly with increasing applied pitch can be used instead of the snubber of the illustrated embodiment. Furthermore, the basic snubber 17 and restraining means 24 may be incorporated in a single elongated member located lengthwise throughout at least part of the length of the flexible beam 13. The invention can be used with rotors having any number of blades and in which the fundamental lag mode frequency is selected to lie between boundaries defined by major forcing frequencies other than the 1-per-rev and 2-per-rev boundaries of the described embodiment.

What is claimed is:

1. A helicopter rotor having a plurality of rotor blades each supported at the end of a torsionally compliant flexible beam extending from a rotor hub and accommodating during operation substantially all of the pitch change, flap and lead/lag movements of the rotor blade, a torque tube enveloping the flexible beam, snubber means adjacent an inboard end of the torque tube and connected between the flexible beam and the torque tube, and pitch change means attached to an inner end of the torque tube for changing the pitch of the attached rotor blade, wherein the stiffness of the flexible beam is greater in a lead/lag plane than in a flap plane and the stiffness in the lead/lag plane reduces as applied pitch is increased, and restraining means connecting the flexible beam and the torque tube outboard of the snubber means and having stiffness characteristics such that its stiffness in the lead/lag plane increases as applied pitch is increased.

2. A rotor as claimed in claim 1, wherein said torque tube is more closely matched in stiffness in the lead/lag and flap planes than the flexible beam.

3. A rotor as claimed in claim 2, wherein the ratio of stiffness of the flexible beam in the lead/lag and flap planes is between 100 to 1 and 400 to 1 and the ratio of stiffness of the torque tube in the lead/lag and flap planes is between 4 to 1 and 20 to 1.

4. A rotor as claimed in claim 1, wherein the restraining means comprise an inner spherical bearing centred on a torsional axis of the flexible beam and outer planar bearings oriented when no pitch is applied substantially in the lead/lag plane and connected between the spherical bearing and internal surfaces of the torque tube.

5. A rotor as claimed in claim 4, wherein said spherical and planar bearings are elastomeric bearings.

6. A rotor as claimed in claim 1, wherein the snubber means and the restraining means comprise an integral elongated member extended lengthwise throughout at least part of the length of the flexible beam.

7. A helicopter rotor having a plurality of rotor blades each supported at the end of a flexible beam extending from a rotor hub and accommodating during operation substantially all of the pitch change, flap and lead/lag movements of the rotor blade, said flexible beam having a greater stiffness in a rotor lead/lag plane than in a rotor flap plane establishing a beam stiffness ratio, a torsionally stiff torque tube enveloping the beam and having a stiffness ratio between the rotor lead/lag plane and the flap plane lower than said beam stiffness ratio, pitch change means attached to an inner end of the torque tube for changing the pitch of the attached rotor blade whereby as the pitch is increased the flexible beam is deflected causing a reduction in its stiffness in the lead/lag plane, snubber means connected between an inboard end of the torque tube and the flexible beam and restraining means connecting the flexible beam and torque tube outboard of the snubber means and having stiffness characteristics such that its stiffness in the lead/lag plane increases as applied pitch increases so as to induce bending of the torque tube in the lead/lag plane whereby due to its lower stiffness ratio the stiffness of the rotor in the lead/lag plane is increased to reduce a range of fundamental lag mode frequency of the rotor between respective minimum and maximum values within an operational range of applied pitch angles.

* * * * *